US 6,708,225 B1

(12) United States Patent
Cho et al.

(10) Patent No.: US 6,708,225 B1
(45) Date of Patent: Mar. 16, 2004

(54) AGENT SYSTEM AND METHOD

(75) Inventors: Kenta Cho, Tokyo (JP); Naoki Kase, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/531,518

(22) Filed: Mar. 21, 2000

(30) Foreign Application Priority Data

Mar. 24, 1999 (JP) .......................................... 11-079045

(51) Int. Cl.⁷ ................................................ G06F 9/44
(52) U.S. Cl. ...................................... 709/317; 709/202
(58) Field of Search .................................. 709/202, 317

(56) References Cited

U.S. PATENT DOCUMENTS

| | | | | |
|---|---|---|---|---|
| 5,706,516 A | * | 1/1998 | Chang et al. ................ | 709/314 |
| 5,963,944 A | * | 10/1999 | Adams ......................... | 707/10 |
| 6,163,794 A | * | 12/2000 | Lange et al. ................ | 709/202 |
| 6,314,455 B1 | * | 11/2001 | Cromer et al. ............. | 709/217 |
| 6,381,735 B1 | * | 4/2002 | Hunt ........................... | 717/158 |
| 6,438,582 B1 | * | 8/2002 | Hsiao et al. ................ | 709/206 |
| 6,438,744 B2 | * | 8/2002 | Toutonghi et al. .......... | 717/137 |
| 6,466,964 B1 | * | 10/2002 | Leung et al. ............... | 709/202 |

OTHER PUBLICATIONS

Shel Sutton, "OMG Internet Platform Special Interest Group Minutes of Meeting #12", Jun. 1997.*
OMG TC Document orbos/Oct. 5, 1997 Joint Submission Mobile Agent System Interoperability Facilities Specification; GMD FOKUS, International Business Machines Corporation; Nov. 10, 1997.

* cited by examiner

Primary Examiner—John Follansbee
Assistant Examiner—Phuong N. Hoang
(74) Attorney, Agent, or Firm—Oblon, Spivak, McClelland, Maier & Neustadt, P.C.

(57) ABSTRACT

An agent system processes information by agents. The agent system is connected to an agent system of different type through a network. A wrapper class memory stores component data of wrappers corresponding to each type of agent system. The wrapper specially processes information in a corresponding agent system. A wrapper generation section generates a wrapper corresponding to an agent system of a different type based on the component data of the different type in the wrapper class memory. The wrapper acts for the agent to use resources in the other agent system.

25 Claims, 10 Drawing Sheets

| WRAPPER CLASS | WRAPPER MODEL DATA |
|---|---|
| AGENT SYSTEM TYPE AS | INTERFACE FROM ACTIVATION SECTION |
| | INTERFACE TO EXTERNAL COMMUNICATION SECTION |
| | WRAPPER COMPONENT NO. 1 |
| AGENT SYSTEM TYPE BS | INTERFACE FROM ACTIVATION SECTION |
| | INTERFACE TO EXTERNAL COMMUNICATION SECTION |
| | WRAPPER COMPONENT NO. 2 |
| AGENT SYSTEM TYPE CS | INTERFACE FROM ACTIVATION SECTION |
| | INTERFACE TO EXTERNAL COMMUNICATION SECTION |
| | WRAPPER COMPONENT NO. 3 |
| ⋮ | ⋮ |

*FIG. 3*

| GO TO COMMAND PARAMETER | WRAPPER CLASS |
|---|---|
| PARAMETER a | AGENT SYSTEM TYPE AS |
| PARAMETER b | AGENT SYSTEM TYPE BS |
| PARAMETER c | AGENT SYSTEM TYPE CS |
| ⋮ | ⋮ |

*FIG. 4*

AGENT SYSTEM AND METHOD

FIELD OF THE INVENTION

The present invention relates to an agent system and a method for an agent in agent system to easily use resources in another agent system of a different type.

BACKGROUND OF THE INVENTION

As a technique to process information distributed on a network of a computer, an agent system is well known. The agent is a processing unit on software and autonomically moves according to a surounding status. In the agent system, this agent executes processing such as data collection by moving on a node. In case of using resources on the node, typically, the agent moves to the node and accesses the resources. In this case, the node is a logical unit consisting of the network. A plurality of nodes exist in one machine, i.e., one computer.

Recently, various kinds of agent systems are realized. These agent systems respectively prepare its language system and movement method. The agent existing in one agent system can move to another agent system whose type is the same as the one agent system. However, the agent cannot move to another agent system whose type is different from the one agent system (it is called a different type agent system.).

FIG. 1 is a block diagram of a plurality of agent systems connected by a network in case the agent A0 in the network uses the resource in the different kind agent system according to the prior art. As shown in FIG. 1, if the agent A0 in the agent system A wishes to use the resources in the agent system B, the agent A0 asks the agent system B about another agent system movable for the agent A0 and near from the agent system B by the network. If the agent system B informs agent system C as the answer to the agent A0, the agent A0 moves to the agent system C and accesses the resources in the agent system B by using a communication means equipped in the agent A0. Furthermore, in FIG. 1, a directory server S having information such as position and type of each agent system is connected to the network N0. The agent asks the directory server S through the network N0 in order to obtain the information such as position and type of each agent system.

The communication means including a protocol used by the agent is different for each agent system. In the example shown in FIG. 1, in order for the agent A0 to access the resources in the agent system B, a communication means corresponding to the agent system B as the communication party is necessary. In short, in the prior art, the agent must decide a type of the agent system as the communication party and select the communication means corresponding to the type of the agent system. Therefore, in the example shown in FIG. 1, even if the agent A0 moves to a node in the agent system C, the agent A0 can not access the resources of the agent system B by using the communication means for accessing the resources of the agent system C. In the above example, it is not regarded that the agent A0 moves to the different type agent system. In this case, the different type agent system for the agent is another agent system of different type having a different communication means in comparison with the original agent system in which the agent is generated and active.

Especially, in the prior art, a general mechanism to realize the communication means between the agent and the agent system does not exist. Therefore, original communication means is respectively created for each agent system of the other party as object of resource use and movement. This original communication means must be previously given to the agent using the resources and moving. However, this execution is complicated and difficult.

Furthermore, in FIG. 1, the directory server controls only limited information such as place of the agent and the agent system. Therefore, the communication means between different type agent systems must be specially controlled. This execution is also complicated and difficult.

SUMMARY OF THE INVENTION

It is an object of the present invention to provide an agent system and a method for the agent to easily use the resources in a different type agent system of an unknown type of agent system as the other party.

According to the present invention, there is provided an agent system for processing information by an agent, the agent system being connected to another agent system of a different type through a network, comprising: wrapper class memory configured to store component data of a wrapper corresponding to each type of agent system, said wrapper for specially processing information in corresponding agent system; and wrapper generator configured to generate the wrapper corresponding to another agent system of a different type based on the component data of the different type stored in said wrapper class memory; wherein said wrapper acts for or represents the agent to use resources in the other agent system.

Further in accordance with the present invention, there is also provided a method for processing information by an agent in an agent system, the agent system being connected to another agent system of different type through a network, comprising the steps of: storing component data of a wrapper corresponding to each type of agent system, the wrapper for specially processing information in a corresponding agent system; and generating the wrapper corresponding to the other agent system of a different type based on the component data of the different type stored; wherein the wrapper acts for the agent to use resources in the other agent system.

Further in accordance with the present invention, there is also provided a computer readable memory containing computer readable instructions to process information by an agent in an agent system, the agent system being connected to another agent system of different type through a network, comprising: the first instruction to cause a computer to store component data of a wrapper corresponding to each type of agent system, the wrapper for specially processing information in a corresponding agent system; and the second instruction to cause a computer to generate the wrapper corresponding to the other agent system of a different type based on the component data of the different type stored; wherein the wrapper acts for the agent to use resources in the other agent system.

BRIEF DESCRIPTION OF THE DRAWINGS

FIG. 3 is a schematic diagram of one example of the content in a wrapper class memory according to the first embodiment of the present invention.

FIG. 4 is a schematic diagram of one example of content in a correspondence table according to the first embodiment of the present invention.

DETAILED DESCRIPTION OF THE PREFERRED EMBODIMENT

Hereinafter, a plurality of embodiments of the present invention is explained by referring to the Figs. In the present invention, generally, a computer including peripheral equipment is controlled by software. In this case, the software is composed of a combination of instructions disclosed in following embodiments. As for common part between the present invention and the prior art, a method explained in the prior art is used. The software includes not only program code but also prepared data to use for execution of program code. From the software, functional effect of the present invention is realized by using physical resources of a processing apparatus such as a CPU, a processor, each kind of chip set, an input apparatus such as a keyboard and a mouse, a memory apparatus such as a hard disk, an output apparatus such as a display, and a printer. The component of concrete software and hardware to realize the present invention may be changed in various ways. For example, as a format of the software, compiler, interpreter, assembler are selectively used. In order to communicate data to external side, attachable recording medium such as a memory and a floppy disk and a network connection apparatus is selectively used. The recording medium such as CD-ROM recording software or program to realize the present invention is regarded as one mode of the present invention. Furthermore, one part of the function of the present invention may be realized by a physical electronic circuit such as LSI. As mentioned-above, the mode to realize the present invention using the computer is considered in various ways. Therefore, hereinafter, the present invention and embodiments are explained by using a virtual circuit block to realize each function included in the present invention and embodiments.

Figure 1:
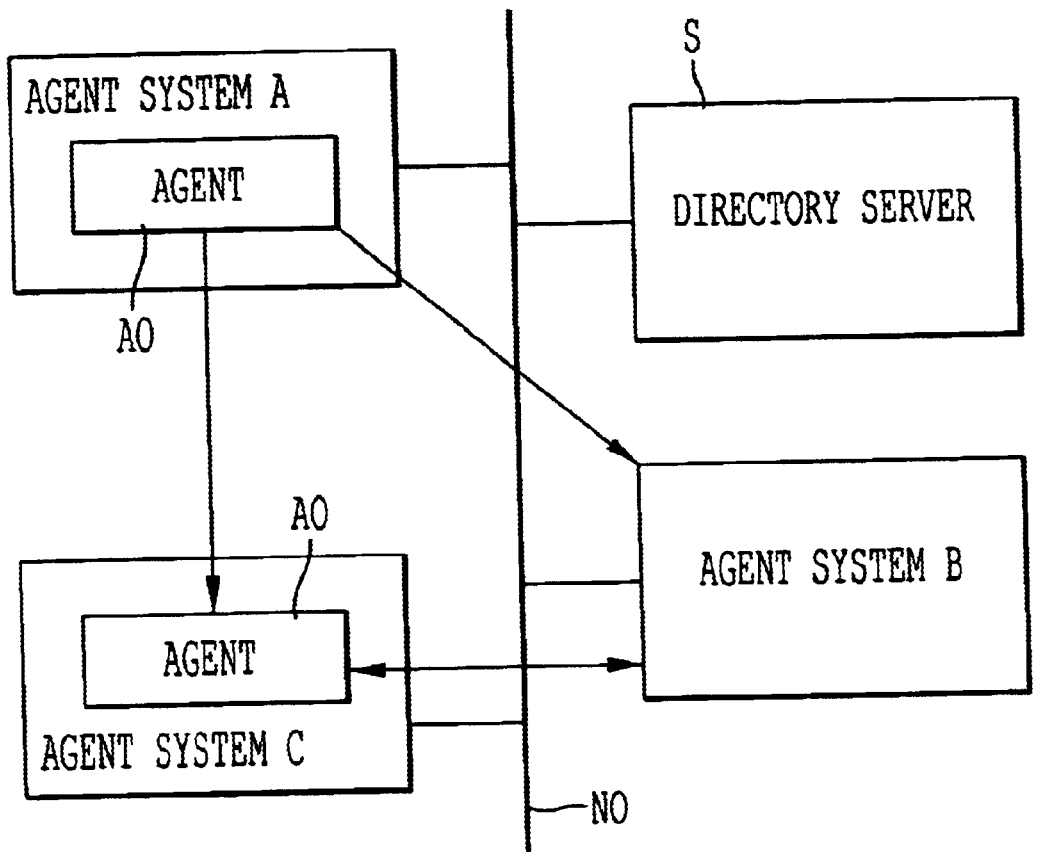
FIG. 1 is a block diagram of one example of the agent system according to the prior art.
Figure 2:
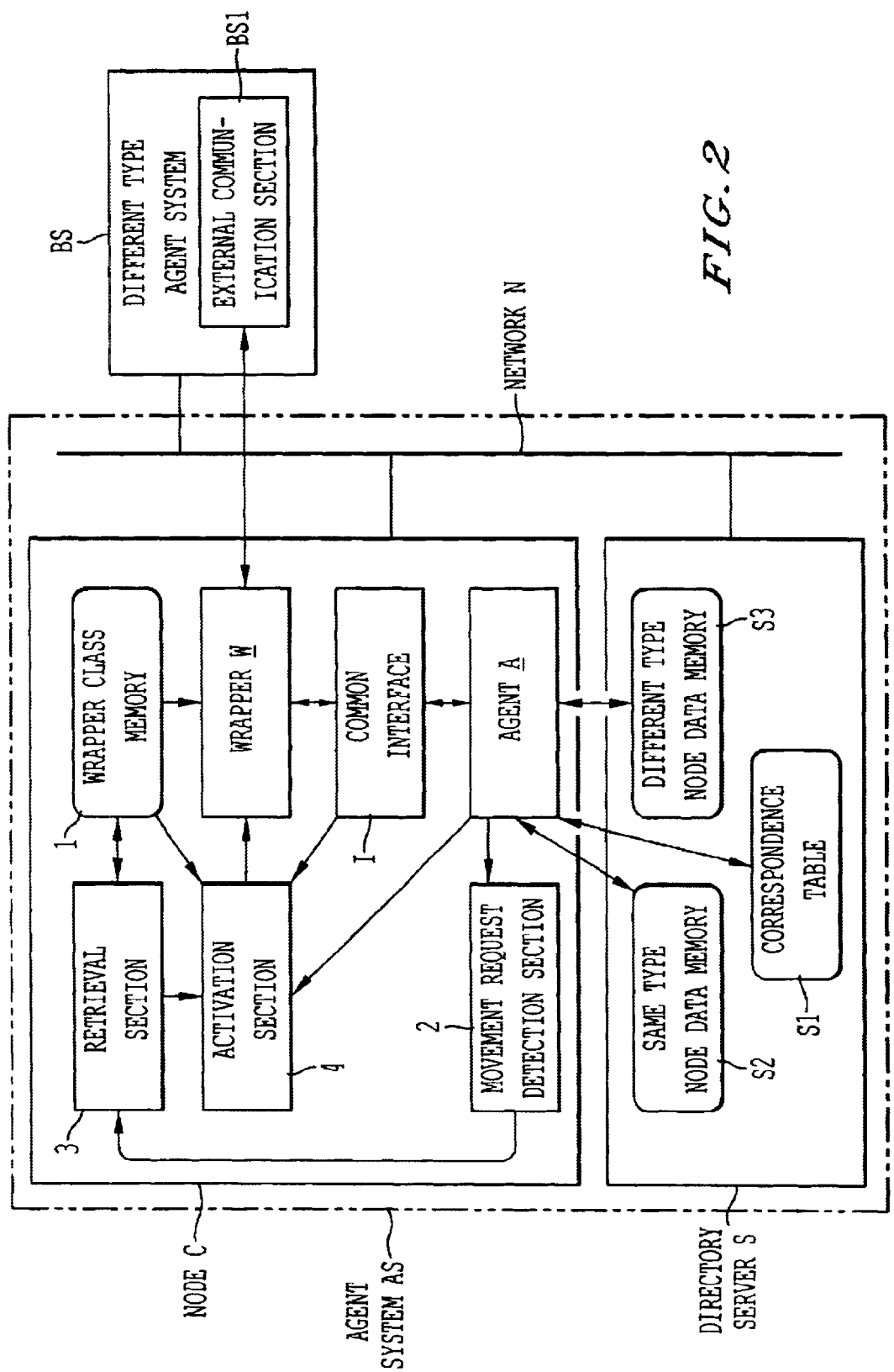
FIG. 2 is a block diagram of the agent system according to a first embodiment of the present invention.

FIG. 2 is a block diagram of the agent system according to a first embodiment of the present invention. As shown in FIG. 2, the agent system As consists of a node C as activity place of the agent, a directory server S to store information of the agent and the node, and a network N connecting the node C and the directory server S. The network N connects another agent system BS whose type is different from the agent system AS. This agent system BS represents one of a plurality of different type agent systems connectable to the agent system AS, and includes an external communication section BS1.

As shown in FIG. 2, the node C includes a wrapper class memory 1 for storing wrapper class used by the agent in case of moving to a different type agent system. In the first embodiment, in order for the agent A to utilize the resources in the different type agent system, the agent A differently uses a wrapper corresponding to type of the agent system as a movement destination. The wrapper converts movement and action of the agent in the agent system AS to those in the different type agent system BS. The wrapper class represents component data of the wrapper of each type. In short, as for a behavior such as movement and communication of the agent A in the agent system AS in which the agent A is generated, the wrapper class is model data to convert the behavior according to the type of another agent system as a destination of movement and communication of the agent A.

FIG. 3 is a schematic diagram of one example of content of the wrapper class memory 1. As shown in FIG. 3, the wrapper model data of each type consists of an interface from an activation section 4, an interface to the external communication section BS1, and the wrapper component. Therefore, when the agent A in the node C actually executes the movement or the communication for the different type agent system BS, the wrapper W is generated from the wrapper model data of the type corresponding to the different type agent system BS.

As shown in FIG. 2, the node C includes the wrapper class memory 1, a movement request detection section 2, a retrieval section 3, and an activation section 4. The directory server S includes a correspondence table S1, a same type node data memory S2, and a different type node data memory S3. The correspondence table S1 represents a correspondence relation between the wrapper class and the type of agent system as the movement destination of the agent. FIG. 4 is a schematic diagram of one example of the content of the correspondence table S1. As shown in FIG. 4, the correspondence table consists of a parameter of a movement instruction (GO TO COMMAND) of the agent and corresponding wrapper class.

In FIG. 2, the movement request detection section 2 detects a movement request of the agent A to move to the different type agent system BS. The retrieval section 3 extracts the wrapper class corresponding to the different type agent system as the movement destination by referring to the correspondence table S1. The activation section 4 generates the wrapper W based on the wrapper class retrieved by the retrieval section 3, supplies data of the agent A for the movement request to the wrapper W through a common interface I previously determined between the wrapper W and the agent A, and activates the wrapper W. In the directory server S, the same type node data memory S2 stores first node data (called same type node data) representing the type of the agent system in which each node is included. The different type node data memory S3 stores second node data (called different type node data) necessary for accessing to the node in the different type agent system. As an example of the different type node data, server name, IP address, port number, kind of communication protocol, and identification data are used.

The wrapper class may be independently composed for each different type agent system or composed as one unit for a plurality of different type agent systems. As for all wrapper classes, the agent can access to the wrapper W generated from the wrapper class through the common interface I. In FIG. 2, the wrapper class memory 1, the movement request detection section 2, the retrieval section 3, the activation section 4, the correspondence table S1, the same type node data memory S2, the different type node data memory S3, the wrapper W, and the common interface I compose a means for the agent A to use the resources in the different type agent system by converting activity of the agent A in the agent system AS to activity in the different type agent system BS.

Figure 5:
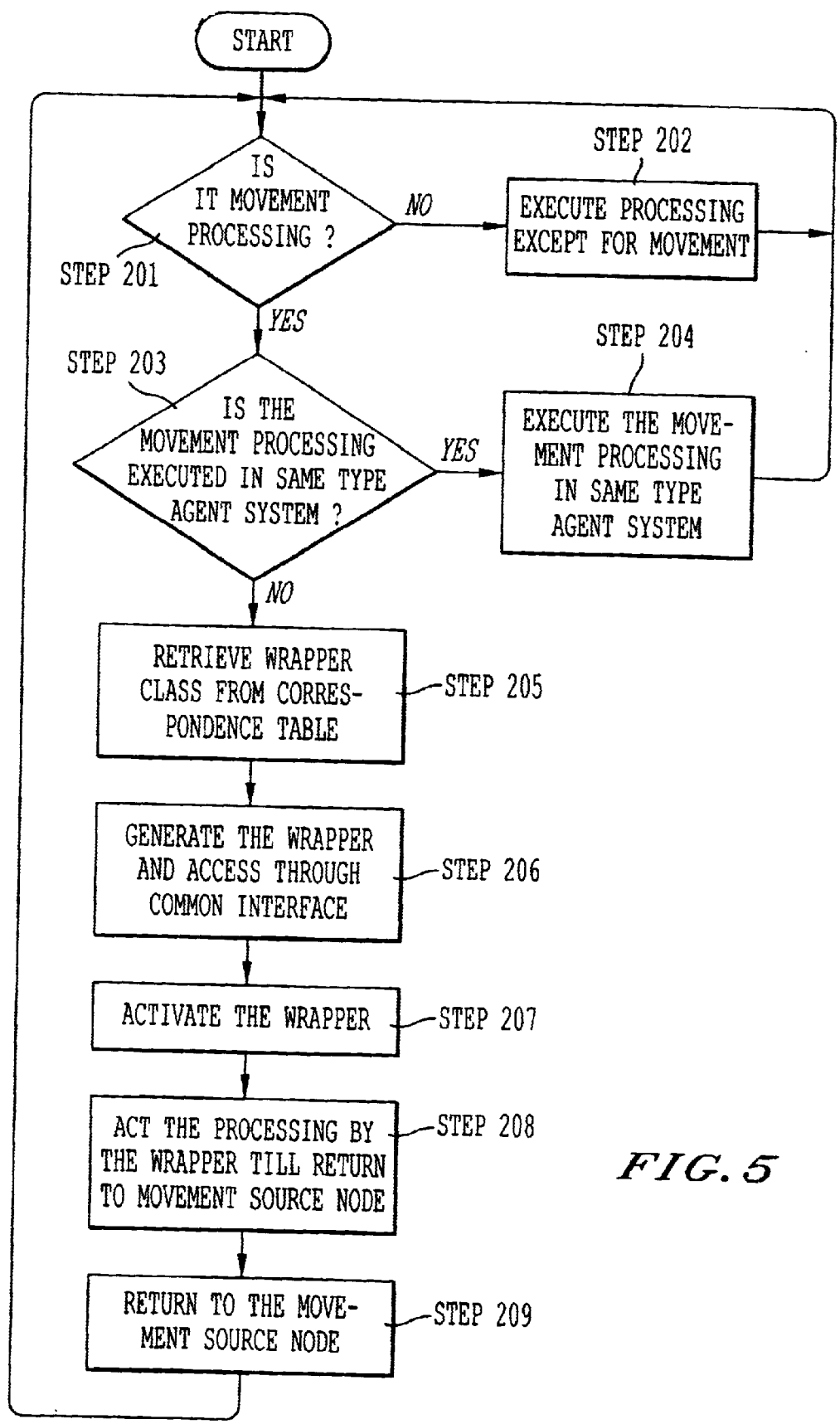
FIG. 5 is a flow chart of processing of the agent system according to the first embodiment of the present invention.

FIG. 5 is a flow chart of processing of the agent system in case the agent A in the agent system AS moves to the different type agent system BS. First, the agent preserves content of activity of the agent as a form of script. This script consists of lines of commands executed by the agent and a control sentence structure. The agent executes the commands according to the control sentence structure using an interpreter means not shown in FIG. 2. Furthermore, in the script, a command to activate a function of the agent and a command for the agent to access to the external section are included. The agent moves to another node by "go to command" as one kind of these commands. In short, when the agent executes this "go to command" (step 201), the movement request detection section 2 decides whether the movement destination as a parameter of "go to command" is a node in same type agent system by referring to the same type node data memory S2 in the directory server S (step 203).

If the node as the movement destination is included in the same type agent system AS, the movement processing of the agent is executed in the same type agent system AS (step 204). This movement processing is executed according to a function of data transfer prepared by the agent A and the agent system AS in which the agent A is generated. In this case, the wrapper W is not necessary. On the other hand, if the node as the movement destination is included in the different type agent system BS, the retrieval section 3 retrieves the wrapper class corresponding to the different type agent system BS by referring to the correspondence table S1 in the directory server S (step 205). Then, the agent A indicates the activation section 4 to generate the wrapper.

In response to this indication signal, the activation section 4 generates the wrapper W corresponding to the different type agent system BS according to the wrapper class retrieved by the retrieval section 3 (step 206). Then, the activation section 4 supplies the data necessary for the movement of the agent A to the wrapper W through the common interface I and activates the wrapper W (step 207). As the data supplied to the wrapper W, the script of the agent A, a program counter of the script, each kind of property of the agent A, an object possessed by the agent A, are used. Furthermore, the activation section 4 supplies different type node data necessary for the wrapper W for accessing the different type agent system BS to the wrapper W. This different type node data is obtained from the different type node data memory S3 in the directory server S.

The wrapper W converts the movement and the activity of the agent A executed in the agent system AS to those in the different type agent system BS. The wrapper W acts for the agent A in the different type agent system BS and returns a function of the agent A to the agent system AS as a movement source. In short, the wrapper W executes the processing in the different type agent system BS instead of the agent A till the agent A returns to the movement source agent system AS (step 208). Concretely, the wrapper W interpretes the script supplied by the agent A, and communicates to the different type agent system BS through the external communication section BS1 if it is necessary to access the different type agent system BS.

In case of executing the movement command to the movement source agent system AS insted of the agent A, the wrapper W supplies data as the processing result to the agent A, and makes the agent A being the active status in the movement source agent system AS (step 209). In this case, the processing executed by the wrapper W in the different type agent system BS is continually executed by the agent A in the movement source agent system AS. In case of executing the script by the agent A and the wrapper W, the command except for "GO TO COMMAND" is executed as a corresponding processing except for the movement processing (step 202).

As mentioned-above, in the first embodiment, activity of the agent A in the original agent system AS is converted to corresponding activity in the different type agent system BS. Therefore, the agent A can utilize the resources in the different type agent system BS in the same way as the steps in the original agent system AS. Especially, when the agent A moves to the different type agent system BS, the wrapper W to specially execute the processing in the different type agent system BS is generated and executes the corresponding activity in the different type agent system BS instead of the agent A. Therefore, the agent A can access the resources in the different type agent system BS by a format same as the format to access the resources in the original agent system AS.

In this way, the agent A can freely act as if the agent A moves to the node in the different type agent system BS in the same way as the movement to the node in the same type agent system AS. As a result, the script of the agent A is easily described. Furthermore, the communication between the wrapper W and the agent A is executed through the common interface I. Therefore, in case of generating new wrapper W, the agent A is not necessary to be changed.

In the first embodiment, it is easily decided whether the movement destination node is included in the different type agent system BS by referring to the same type node memory S2 in the directory server S. Furthermore, in order to access the node in the different type agent system BS, necessary data (different type node data) such as the server name, the IP address, the port number, the type of communication protocol, the identification data, are supplied to the wrapper W in case of activating the wrapper W. Therefore, the wrapper W can smoothly access the node in the different type agent system BS using the communication means corresponding to the node.

Next, the wrapper is differently composed by combination of the movement source agent system AS and the movement destination agent system BS of different type.

First, in the movement source agent system, assume that the agent and an agent control means for realizing a generation, an elimination and an action of the agent are composed by Java object, and the movement destination agent system has a means for accepting the agent composed by Java object. In this case, in order to realize a function of the wrapper, Java object of the agent and the agent control means in the movement source agent system are sent to the movement destination agent system as a wrapped agent. This component of the wrapper is called a wrapper component 1.

Second, as for content of the processing executed by the agent in the movement destination agent system, assume that the wrapper can convert the content to a format interpretable for the movement destination agent system. In this case, in order to realize a function of the wrapper, the wrapper converts the content of the processing to the interpretable format, and the wrapper requests the movement destination agent system to execute the processing by the interpretable format. This component of the wrapper is called a wrapper component 2.

Third, if above-mentioned components are not realized, in order to realize a function of the wrapper, the wrapper executes the activity in the movement source agent system and communicates to the movement destination agent system if necessary. This component of the wrapper is called a wrapper component 3. Hereinafter, concrete examples of the wrapper components 1, 2, 3 are explained in order as the second, third, fourth embodiments.

Figure 6:
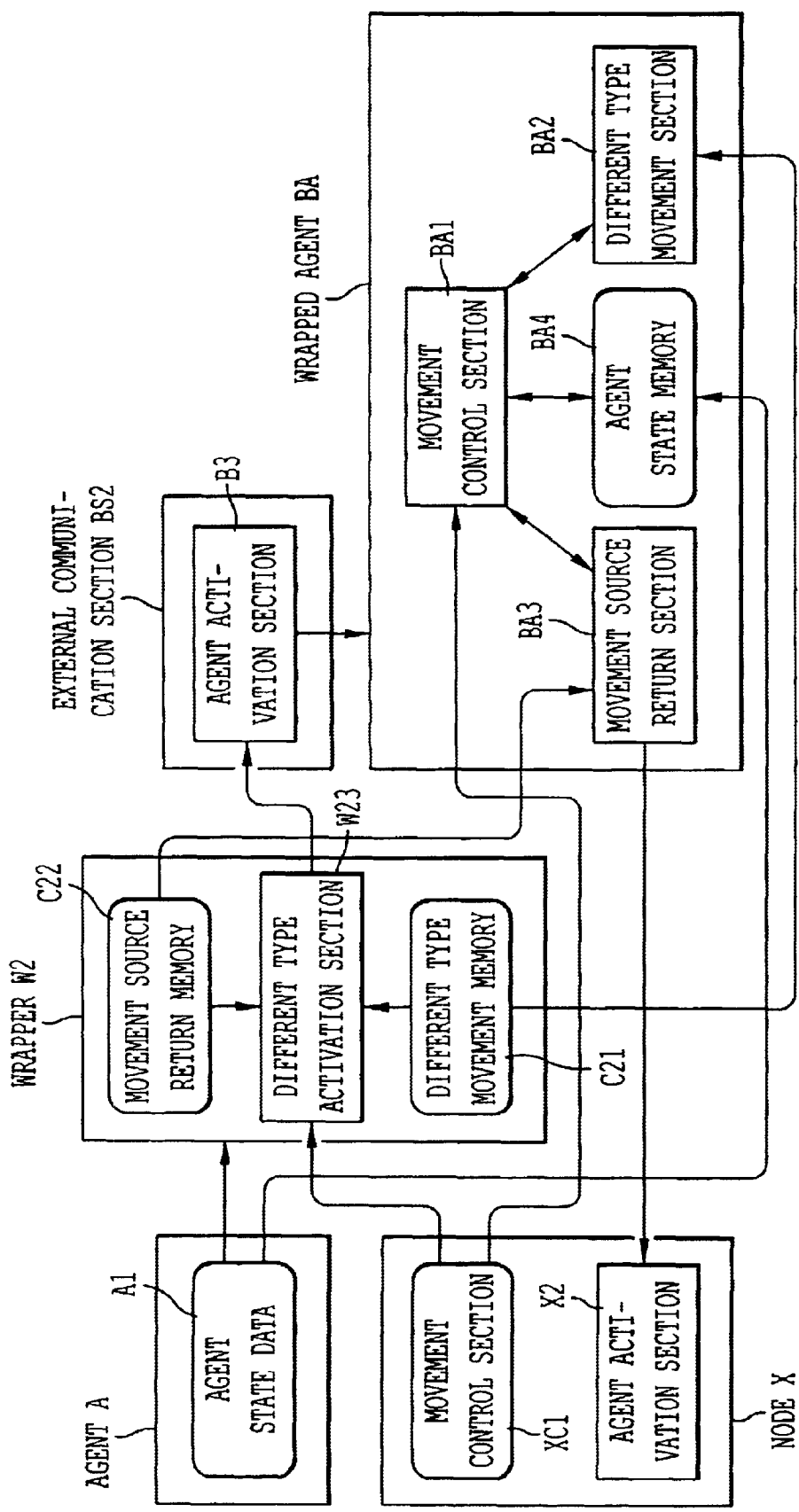
FIG. 6 is a block diagram of a wrapper in the agent system according to a second embodiment of the present invention.

FIG. 6 is a block diagram of the wrapper component 1 as the second embodiment of the present invention. In the second embodiment, the external communication section BS2 includes an agent activation section B3. The agent activation section B3 activates an agent in the different type agent system.

The node X includes a movement control section XC1 and an agent activation section X2. The movement control section XC1 stores data representing steps of the agent's activity by execution of the script in a node of the different type agent system. The agent activation section X2 activates the agent to return to a node in the movement source agent system.

The wrapper W2 includes a different type movement memory C21, a movement source return memory C22, and a different type activation section W23. The different type movement memory C21 stores data representing steps of the agent's movement in the different type agent system. The movement source return memory C22 stores data representing steps of the agent's return from the movement destination agent system to the movement source agent system. The different type activation section W23 supplies the data stored in the different type movement memory C21 and the movement source return memory C22, agent state data A1, and data stored in the movement control section XC1 to the agent activation section B3 in the external communication section BS2. As a result, the agent activation section B3 generates a wrapped agent BA based on component of the wrapper W2 and activates the wrapper W2. The wrapped agent BA continually executes the activity of the agent A in the different type agent system, and includes a movement control section BA1, a different type movement section BA2, a movement source return section BA3, and an agent state memory BA4. The movement control section BA1 makes the agent act in a platform of the different type agent system according to the agent state data stored in the agent state memory BA4. The movement control section BA1 is generated by the model data stored in the movement control section XC1 supplied from the node X. The different type movement section BA2 presents a function to move the agent in the movement destination agent system. The different type movement section BA2 is generated by the model data stored in the different type movement memory C21 supplied from the wrapper W2. The agent state memory BA4 stores the agent state data such as the script and the execution status of the agent in the movement source agent system. When the wrapped agent BA is generated, the agent state data A1 in the agent A is copied to the agent state memory BA4 in the wrapped agent BA as the agent state data. The movement source return section BA3 presents a function to return the agent from the different type agent system to the movement source agent system. The movement source return section BA3 is generated by the model data stored in the movement source return memory C22 supplied from the wrapper W2.

The operation of the agent system of the second embodiment is explained. In the same way as in the first embodiment, the wrapper W2 corresponding to the different type agent system as movement destination of the agent is generated. The different type activation section W23 in the wrapper W2 supplies data stored in the movement control section XC1, the agent state data A1, the different type movement memory C21, and the movement source return memory C22 to the agent activation section B3 in the external communication section BS2. The agent activation section B3 generates the wrapped agent BA using the supplied data. In the wrapped agent BA generated on the different type agent system, the movement control section BA1 moves the agent such as executing the script on the platform of the different type agent according to the agent state data in the agent state memory BA4. The different type movement section BA2 presents the movement function in this agent system as the movement destination to the movement control section BA1. The movement source return section BA3 executes a return processing of the wrapped agent BA to go back to a movement source agent system using the agent activation section X2 in the node X of the movement source agent system.

Figure 7:
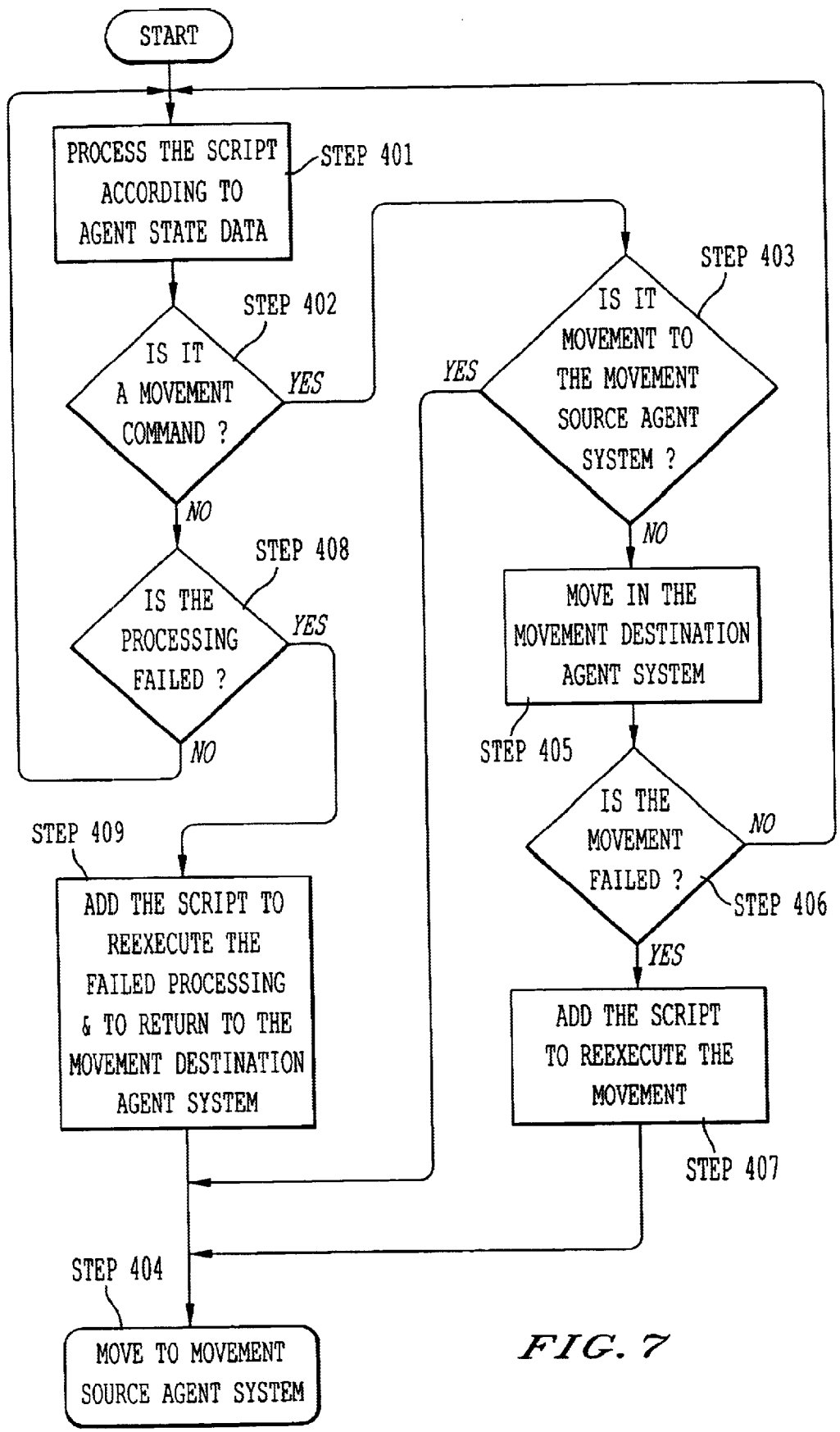
FIG. 7 is a flow chart of processing of the wrapper according to the second embodiment of the present invention.

FIG. 7 is a flow chart of movement processing of the wrapped agent BA on the different type agent system. First, the movement control section BA1 reads the script or an execution status of the script from the agent state data in the agent state memory BA4, processes a command in the script, and updates the agent state data in the agent state memory BA4 (step 401). If the command in the script is a movement command (step 402), it is determined whether the movement destination is the movement source agent system (original agent system from which the agent is generated) (step 403). If the movement destination is the movement source agent system, a function of the agent is returned to the movement source agent system by the movement source return section BA3. On the other hand, if the movement destination is not the movement source agent system, the wrapped agent BA is moved in the movement destination agent system (present agent system in which the wrapped agent BA exists) by the different type movement section BA2 (step 405).

If this movement fails in the movement destination agent system (step 406), a script to reexecute the failed movement in the movement source agent system is added to the agent state data in the agent state memory BA4 (step 407), and a function of the agent is returned to the movement source agent system (step 404). Furthermore, if a processing of the command except for the movement command fails in the movement destination agent system (step 408) and if it is possible to execute the command in the movement source agent system, a script to reexecute the failed processing in the movement source agent system and a script to remove to the movement destination agent system (present agent system in which the wrapped agent exists) are added to the agent state data in the agent state memory BA4 (step 409), and the function of the agent is temporarily returned to the movement source agent system (step 404). In this case, the agent state data in the agent state memory BA4 in the wrapped agent BA is supplied to the agent activation section X2 in the node X of the movement source agent system. The agent activation section X2 activates the agent A again in order to continue activity of the agent A.

As mentioned-above, in the second embodiment, different processings by the different type agent system as the movement destination, such as processing step of activation, movement, return to the movement source agent system, are represented as program data in the different type activation section W23, the different type movement memory C21, and the movement source return memory C22. On the other hand, the movement control section BA1 to interpretatively execute the script of the agent is not different by the different type agent system. Therefore, processing steps of the movement control section BA1 are represented as program data in the movement control section XC1 different from the wrapper W2. In case of moving to the different type agent system, the different type activation section W23 in the wrapper W2 generates the wrapped agent BA according to the data stored in the different type movement memory C21, the movement source return memory C22 and the movement control section XC1, and moves the wrapped agent BA in the different type agent system. As a result, even if the number of the different type agent system as the movement destination increases, it is sufficient that data in the different type movement memory C21, the movement source return memory C22, and the movement control section XC1 are changed. In addition to this, if the movement control section BA1 as a control means is changed, it is sufficient that connection parts to the different type movement section BA2, the movement source return section BA3, and the different type activation section W23 are extended. Therefore, a new wrapper is easily generated. Furthermore, in case of failure of movement or processing in the different type agent system, the agent is moved to the movement source node by the movement source return section BA3, and the agent continually executes the processing in the movement source node. Therefore, an impediment does not occur because of the differences between the agent systems.

Figure 8:
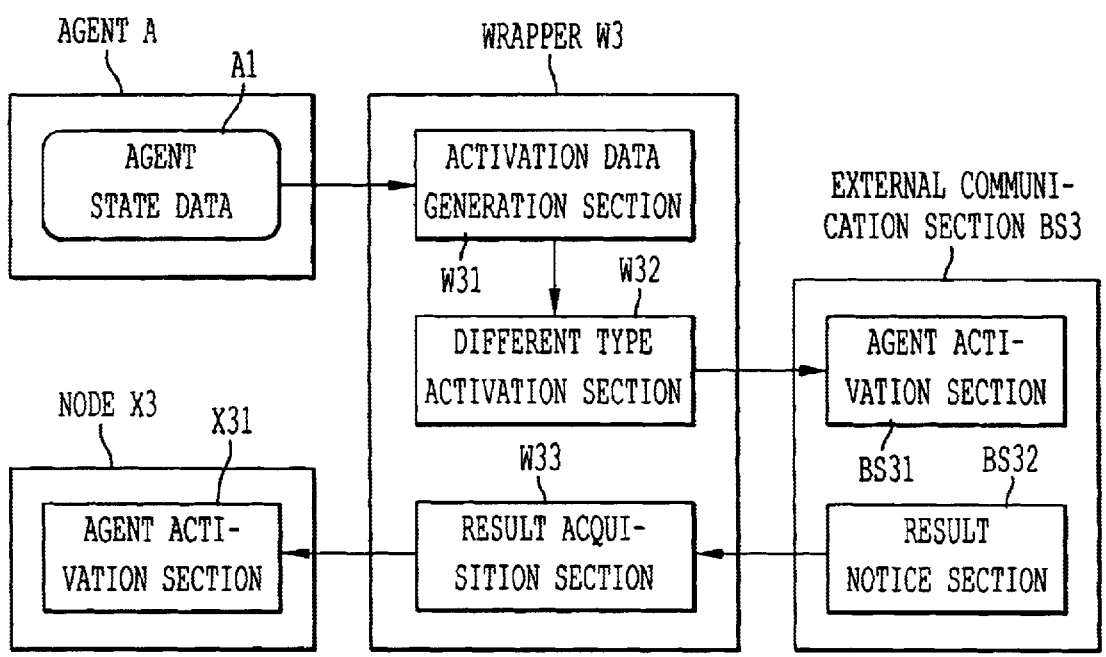
FIG. 8 is a block diagram of the wrapper in the agent system according to a third embodiment of the present invention.

FIG. 8 is a block diagram of the wrapper component 2 as the third embodiment. As shown in FIG. 8, the wrapper W3 includes an activation data generation section W31, a different type activation section W32, and a request acquisition section W33. The activation data generation section W31 analyzes a processing to be executed by the agent in the movement destination and generates agent activation data to activate the agent to accomplish the processing in the movement destination. In short, the agent activation data is based on information for the agent of movement request and represents the processing to be executed by the agent in the different type agent system as the movement destination. The different type activation section W32 generates the agent on the different type agent system according to the agent activation data generated by the activation data generation section W31. Furthermore, in the third embodiment, an external communication section BS3 in the different type agent system includes an agent activation section BS31 and a result notice section BS32. The agent activation section BS31 activates the agent in the different type agent system according to a request from the different type activation section W32 of the wrapper W3. The result notice section BS32 sends the processing result accomplished by the agent to the wrapper W3. Furthermore, the result acquisition section W33 of the wrapper W3 receives the processing result sent by the result notice section BS32, updates the agent state data A1, in agent A and returns the agent to the movement source agent system using the agent activation section X31 existed in the node X3.

The operation of the agent system of the third embodiment is explained. In the same way as in the first embodiment, the wrapper W3 corresponding to the different type agent system as the agent's movement destination is generated. In the wrapper W3, the activation data generation section W31 analyzes the processing to be executed by the agent in the movement destination and generates the agent activation data to activate the agent in the movement destination. The different type activation section W32 generates the agent on the different type agent system through the agent activation section BS31 according to the agent activation data generated by the activation data generation section W31. The agent activation section BS31 in the external communication section BS3 activates the agent on the different type agent system according to the request from the different type activation section W32 in the wrapper W3. The result notice section BS32 in the external communication section BS3 sends the processing result accomplished by the agent to the wrapper W3.

Figure 9:
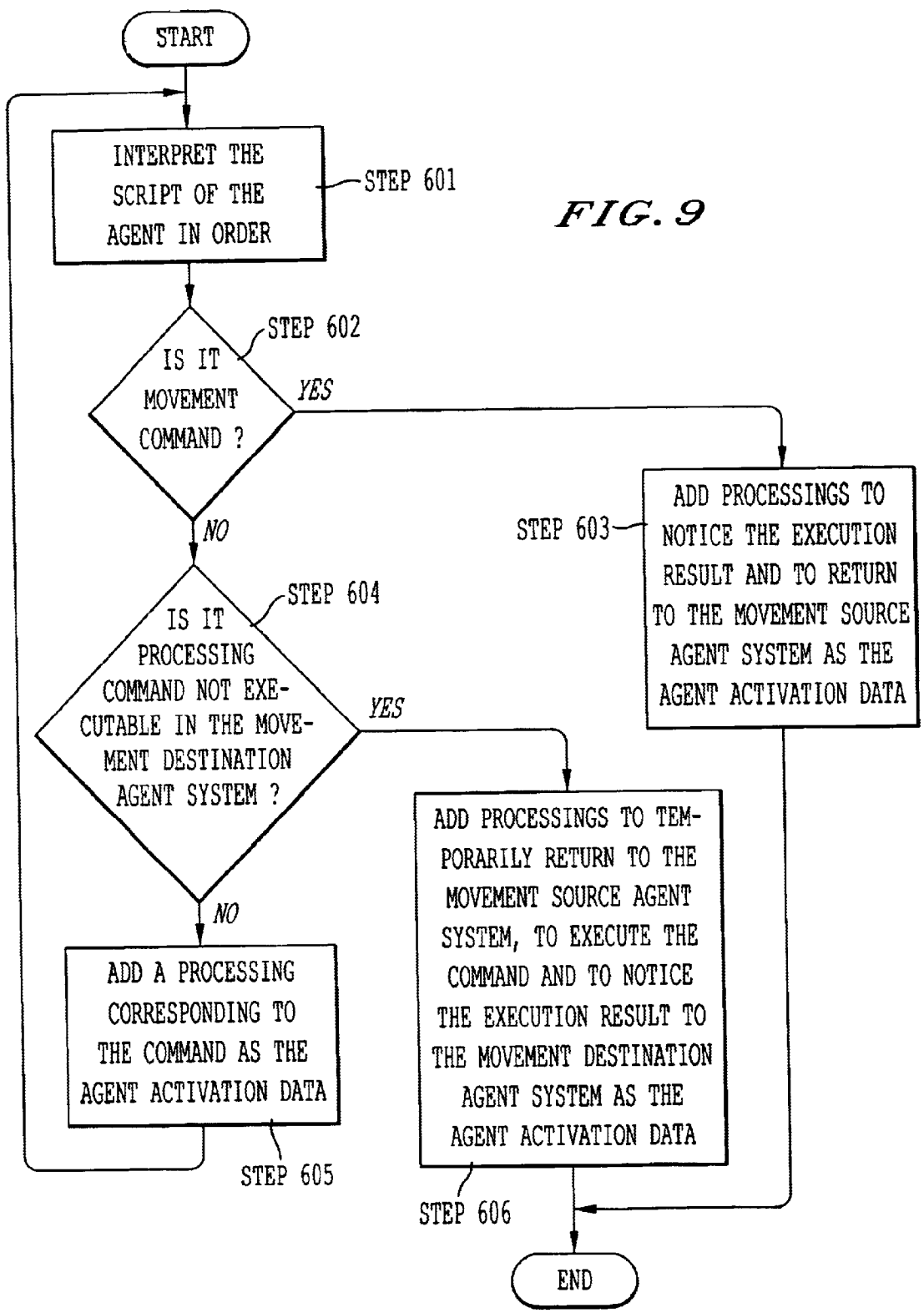
FIG. 9 is a flow chart of processing of the wrapper according to the third embodiment of the present invention.

FIG. 9 is a flow chart of generation processing of the agent activation data by the activation data generation section W31. First, the activation data generation section W31 interpretes the script in the agent state data A1 (step 601) and checks the command in the script in order. Then, the activation data generation section W31 converts a processing of the command to a processing executed in the movement destination agent system and adds the converted processing to the agent activation data to activate the agent on the different type agent system (step 605). In case of the movement command (step 602), a processing for the result notice section BS32 to notice the processing result to the movement source agent system and a processing to continually execute the agent's activity in the movement source agent system from the movement command are added to the agent activation data (step 603). Furthermore, in case of a command not executable in the movement destination agent system (step 604), a processing for the result notice section BS32 to notice the processing result to the movement source agent system, a processing to add the processing result to the agent state data A1, a processing to execute this command in the movement source agent system, a processing to return the execution result to the movement destination agent system, and a processing to remove the function of the agent to the movement destination agent system are added to the agent activation data (step 606).

As mentioned-above, in the third embodiment, even if the different type agent system of the movement destination can not accept the object to interpretatively execute the script of the agent, a second agent is activated in the movement destination agent system according to the agent activation data representing the processing content, and the processing result of the second agent is noticed from the movement destination agent system to the movement source agent system. In this way, the movement of the agent is realized. Especially, in the third embodiment, it is not necessary to transfer the script data of the agent to the movement destination agent system. The agent activation data and the processing result are only transferred between the movement source agent system and the movement destination agent system. Therefore, the communication quantity is greatly reduced.

Figure 10:
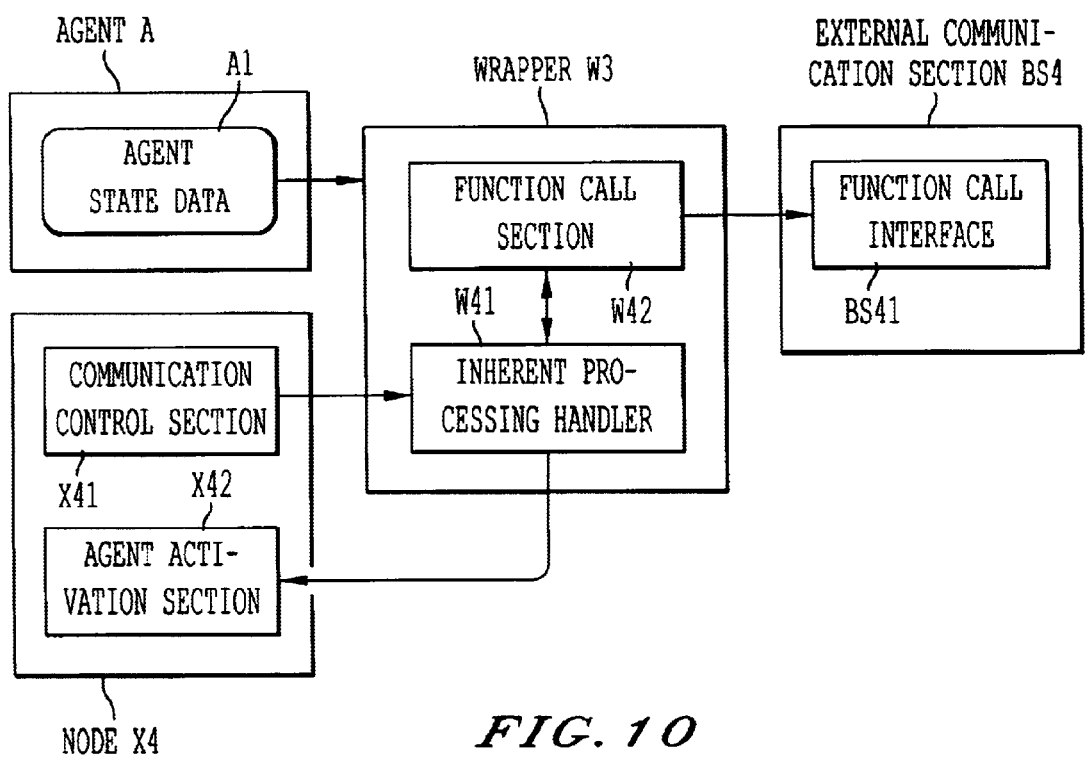
FIG. 10 is a block diagram of the wrapper in the agent system according to a fourth embodiment of the present invention.

FIG. 10 is a block diagram of the wrapper component 3 as the fourth embodiment. As shown in FIG. 10, the wrapper W4 includes an inherent processing handler W41 and a function call section W42. The inherent processing handler W41 includes a description of processing steps of the movement destination agent system if an inherent processing of the agent system is necessary to be executed. In other words, the inherent processing handler W41 is a section to execute the inherent processing previously registered in processings of the different type agent system.

The function call section W42 is a section for the inherent processing handler W41 to call a function of the different type agent system. Furthermore, a function call interface BS41 in the external communication section BS4 executes the call processing from the function call section W42. In short, the function call interface BS41 is a means for calling the function of the different type agent system according to a request from the function call section W42.

As shown in FIG. 10, the node X4 includes a communication control section X41 and an agent activation section X42. The communication control section X41 activates the agent by execution of the script, and communicates to the wrapper W4 and the node on the different type agent system if necessary. In short, the communication control section X41 calls the function of the different type agent system through the inherent processing handler W41, the function call section W42 and the function call interface BS41. Furthermore, the agent activation section X42 is a means for activating the agent on the node of the agent system.

The operation of the fourth embodiment is explained as follows. In the same way as in the first embodiment, the wrapper W4 corresponding to the different type agent system as the movement destination is generated and receives the agent state data A1. The wrapper W4 acts for the agent A on the node X4 of the movement source agent system using the communication control section X41. In case of executing predetermined processing registered by the inherent processing handler W41, the wrapper W4 calls the inherent processing handler W41. The inherent processing handler W41 executes the command processing differently for each agent system, such as the movement command of the agent. In case of return to the movement source agent system, the inherent processing handler W41 calls the agent activation section X42 in the node X4 of the movement source agent system.

Figure 11:
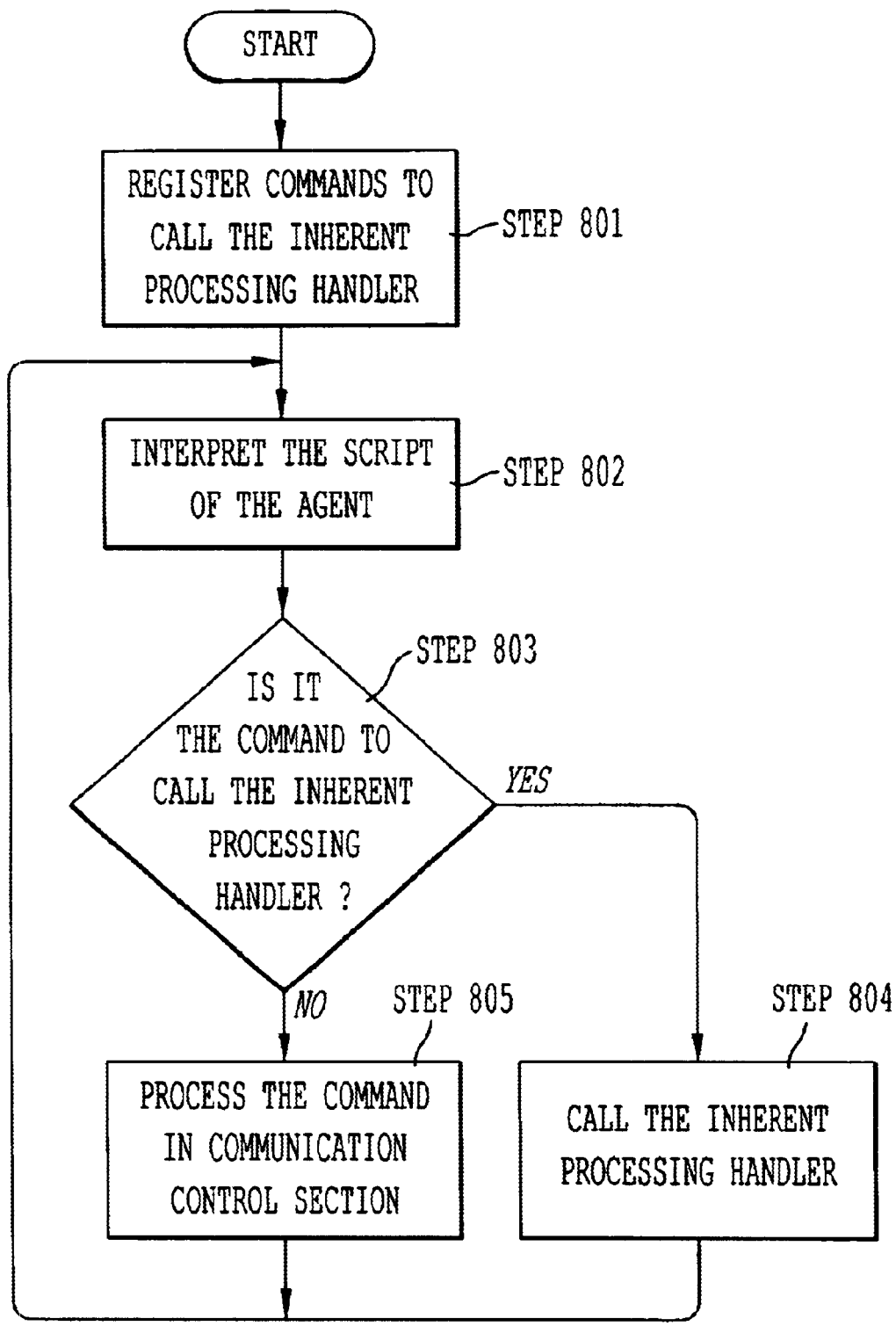
FIG. 11 is a flow chart of processing of a communication control section according to the fourth embodiment of the present invention.

FIG. 11 is a flow chart of processing of the communication control section X41 acting for the agent. First, the communication control section X41 previously registers the command necessary for the wrapper W4 to call the inherent processing handler W41 (step 801). Then, the communication control section X41 interprets the script (step 802) and decides whether a command to be executed is the registered command (step 803). In case of the registered command, the inherent processing command is called (step 804). In case of non-registered command, the communication control section X41 executes the command processing in the movement source agent system (step 805).

As mentioned-above, in the fourth embodiment, a processing to be executed in the movement destination agent system is executed in the movement source agent system. If necessary, a function of the movement destination agent system is called. Therefore, a load to transfer the agent data between the nodes is greatly reduced. Furthermore, the movement destination agent system prepares only the function call interface from the external section. Therefore, a large number of the agent systems are connected by this component.

The present invention is not limited to the above-mentioned embodiments. For example, in case of putting in operation of the present invention, detail design such as a scale of the network, the number of nodes and agents, and the number of the different type agent systems connected to the original agent system, is freely determined. Furthermore, a concrete component of the wrapper and a concrete algorithm of the wrapper to convert the agent's activity to activity corresponding to the different type agent system are freely determined. Furthermore, the same type node data memory and the different type node data memory are not necessarily needed in the directory server. For example, when it is decided whether the movement destination node exists in the same type agent system or the different type agent system, the agent may inquire every each time. As for necessary information to access the node in the different type agent system, the wrapper may acquire the necessary information from the different type agent system.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An agent system for processing information by an agent having agent state data, the agent system as an original agent system being connected to a different type agent system through a network, comprising:

a wrapper class memory configured to store component data of wrappers corresponding to each type of other agent systems, the wrappers being for processing information in a corresponding agent system;

a movement request detector configured to detect a request for the agent to move to the different type agent system from the agent state data; and a wrapper generator, in response to the request, configured to generate a wrapper corresponding to a type of the different type agent system based on the component data of the type stored in said wrapper class memory;

wherein the wrapper generates a wrapped agent based on a component of the wrapper in the different type agent system and supplies the agent state data to the wrapped agent, the wrapped agent executes the agent state data to use resources in the different type agent system, and the agent continually executes the agent state data based on an execution result of the wrapped agent in the original agent system.

2. The agent system according to claim 1, further comprising:

a same type node data memory configured to store node data representing nodes included in agent systems of the same type as the original agent system and other agent systems of a different type discriminately;

a different type node data memory configured to store access data for each node included in the other agent systems; and a correspondence table configured to store correspondence data between each category of movement commands and each type of the other agent systems.

3. The agent system according to claim 2, wherein said movement request detector detects a movement command to move to another node from a script of the agent state data, decides whether said another node is included in the other agent systems of the different type by referring to said same type node data memory, and extracts a type of said another agent system corresponding to the movement command by referring to said correspondence table if the other node is included in the other agent systems of the different type.

4. The agent system according to claim 3, further comprising:

a retrieval unit configured to retrieve the component data of a wrapper corresponding to the type of other agent system extracted by said movement request detector from said wrapper class memory, wherein said wrapper generator extracts the access data for the other node as a movement destination node from said different type node data memory after generating the wrapper, supplies the access data to the wrapper through a common interface, and activates the wrapper.

5. The agent system according to claim 4,
wherein the wrapper executes action of the agent through an external communication unit in the different type agent system, and returns a function of the agent to a movement source node in the original agent system according to a movement command to the movement source node in the script of the agent state data.

6. The agent system according to claim 5,
wherein the wrapper comprises:
- an activation unit configured to activate the wrapped agent in the different type agent system;
- a different type movement memory configured to store data of moving the agent between the different type agent system and another agent system; and
- a movement source return memory configured to store data of returning the agent from the different type agent system to the original agent system.

7. The agent system according to claim 6,
wherein the wrapped agent comprises:
- an agent state memory configured to store the agent state data including the script;
- a movement unit, generated according to data in said different type movement memory in said wrapper, configured to store data of moving the agent between the different type agent system and another agent system;
- a return unit, generated according to data in said movement source return memory in said wrapper, configured to store data of returning the agent from the different type agent system to the original agent system; and
- a controller configured to execute action of the wrapped agent according to the data in said agent state memory, said movement unit and said return unit.

8. The agent system according to claim 7, wherein
if the action of the wrapped agent fails in the different type agent system,
said return unit indicates the agent in the original agent system to execute the same action.

9. The agent system according to claim 5,
wherein the wrapper comprises:
- an activation data generator configured to generate activation data of processing to be executed in the different type agent system according to the script of the agent state data;
- an activation unit configured to activate another agent in the different type agent system according to the activation data; and
- a result acquisition unit configured to receive the processing result executed by another agent in the different type agent system.

10. The agent system according to claim 9, wherein
if a processing instruction not executable in the different type agent system is included in the script of the agent state data,
said activation data generator generates activation data to temporarily return the agent from the different type agent system to the original agent system, to execute the processing instruction in the original agent system and to resend the processing result to the different type agent system.

11. The agent system according to claim 5,
wherein the wrapper comprises:
- an inherent processing handler configured to execute an inherent processing previously registered in the different type agent system; and
- a function call unit configured to call a function of the different type agent system to execute the inherent processing through a function call interface of the movement destination node in the different type agent system.

12. The agent system according to claim 11, wherein
if the instruction in the script of agent state data is a command to execute the inherent processing,
the movement source node in the original agent system calls the function of the different type agent system by said inherent processing handler through said function call unit and said function call interface.

13. A method for processing information by an agent having agent state data in an agent system, the agent system as an original agent system being connected to a different type agent system through a network, comprising:
- storing component data of wrappers corresponding to each type of other agent systems, the wrappers being for processing information in a corresponding agent system;
- detecting a request for the agent to move to the different type agent system from the agent state data; and
- generating a wrapper corresponding to a type of the different type agent system based on the stored component data of the type in response to the request;
- wherein the wrapper generates a wrapped agent based on a component of the wrapper in the different type agent system and supplies the agent state data to the wrapped agent,
- the wrapped agent executes the agent state data to use resources in the different type agent system, and
- the agent continually executes the agent state data based on the execution result of the wrapped agent in the original agent system.

14. The method according to claim 13, further comprising:
- discriminately storing node data representing nodes included in agent systems of the same type as the original agent system and other agent systems of a different type;
- storing access data for each node included in the other agent systems; and
- storing correspondence data between a each category of movement commands and each type of the other agent systems.

15. The method according to claim 14, further comprising:
- detecting a movement command to move to another node from a script of the agent state data;
- deciding whether the other node is included in the other agent systems of the different type by referring to the stored node data; and
- extracting a type of other agent system corresponding to the movement command by referring to the stored correspondence data if the other node is included in the other agent systems of the different type.

16. The method according to claim 15, further comprising:
- retrieving the component data of a wrapper corresponding to the type of other agent system from the stored component data;
- extracting the access data for the other node as a movement destination node from the stored access data after generating the wrapper;

supplying the access data to the wrapper through a common interface; and activating the wrapper.

17. The method according to claim 16, in the wrapper, further comprising:

executing action of the agent through an external communication unit in the different type agent system; and returning a function of the agent to a movement source node in the original agent system according to a movement command to the movement source node in the script of the agent state data.

18. The method according to claim 17, in the wrapper, further comprising:

activating the wrapped agent in the different type agent system;

storing movement data of the agent between the different type agent system and another agent system; and storing return data of the agent from the different type agent system to the original agent system.

19. The method according to claim 18, in the wrapped agent, further comprising:

storing the agent state data including the script;

storing data of moving the agent between the different type agent system and another agent system according to the movement data;

storing data of returning the agent from the different type agent system to the original agent system according to the return data; and executing action of the wrapped agent according to the stored data.

20. The method according to claim 19, further comprising:

if the action of the wrapped agent fails in the different type agent system, indicating the agent in the original agent system to execute the same action.

21. The method according to claim 17, in the wrapper, further comprising:

generating activation data of processing to be executed in the different type agent system according to the script of the agent state data;

activating another agent in the different type agent system according to the activation data; and receiving the processing result executed by another agent in the different type agent system.

22. The method according to claim 21, further comprising:

if a processing instruction not executable in the different type agent system is included in the script of the agent state data, generating activation data to temporarily return the agent from the different type agent system to the original agent system, to execute the processing instruction in the original agent system and to resend the processing result to the different type agent system.

23. The method according to claim 17, further comprising:

in the wrapper, executing an inherent processing previously registered in the different type agent system; and calling a function of the different type agent system to execute the inherent processing through a function call interface of the movement destination node in the different type agent system.

24. The method according to claim 23, further comprising:

if the instruction in the script of agent state data is a command to execute the inherent processing, in the movement source node of the original agent system, comprising:

calling the function of the different type agent system to execute the inherent processing through the wrapper and the function call interface.

25. A computer readable memory containing computer readable instructions to process information by an agent having agent state data in an agent system, the agent system as an original agent system being connected to a different type agent system through a network, comprising:

a first instruction to cause a computer to store component data of wrappers corresponding to each type of other agent systems, the wrappers being for processing information in a corresponding agent system;

a second instruction to cause a computer to detect a request for the agent to move to the different type agent system from the agent state data; and a third instruction to cause a computer to generate a wrapper corresponding to a type of the different type agent system based on the stored component data of the type in response to the request;

wherein the wrapper generates a wrapped agent based on a component of the wrapper in the different type agent system and supplies the agent state data to the wrapped agent, the wrapped agent executes the agent state data to use resources in the different type agent system, and the agent continually executes the agent state data based on the execution result of the wrapped agent in the original agent system.

* * * * *